US010614031B1

(12) United States Patent
Walters et al.

(10) Patent No.: US 10,614,031 B1
(45) Date of Patent: Apr. 7, 2020

(54) SYSTEMS AND METHODS FOR INDEXING AND MAPPING DATA SETS USING FEATURE MATRICES

(71) Applicant: Capital One Services, LLC, McLean, VA (US)

(72) Inventors: Austin Walters, Savoy, IL (US);
Jeremy Goodsitt, Champaign, IL (US);
Vincent Pham, Champaign, IL (US);
Galen Rafferty, Mahomet, IL (US);
Anh Truong, Champaign, IL (US);
Reza Farivar, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/505,693

(22) Filed: Jul. 8, 2019

(51) Int. Cl.
*G06F 16/13* (2019.01)
*G06F 16/14* (2019.01)
*G06N 3/04* (2006.01)
*G06N 3/08* (2006.01)

(52) U.S. Cl.
CPC ............ *G06F 16/13* (2019.01); *G06F 16/148* (2019.01); *G06N 3/04* (2013.01); *G06N 3/0445* (2013.01); *G06N 3/0454* (2013.01); *G06N 3/088* (2013.01)

(58) Field of Classification Search
CPC ........ G06F 16/13; G06F 16/148; G06F 16/22; G06F 16/2264; G06F 16/31; G06F 16/41; G06F 16/51; G06F 16/61; G06F 16/71; G06F 16/81; G06N 3/0445; G06N 3/0454; G06N 3/088; G06N 3/04
USPC ......................................... 707/711, 736–746
See application file for complete search history.

(56) References Cited

U.S. PATENT DOCUMENTS

| 2011/0219008 | A1* | 9/2011 | Been | G06F 16/00 707/742 |
| 2011/0264646 | A1* | 10/2011 | Sokolan | G06F 16/313 707/711 |
| 2014/0040273 | A1* | 2/2014 | Cooper | G06F 16/94 707/741 |

(Continued)

OTHER PUBLICATIONS

Kiwon Lee et al., "Alternating Autoencoders for Matrix Completion," *2018 IEEE Data Science Workshop (DSW)*, Lausanne, Switzerland (2018), 5 pages.

(Continued)

*Primary Examiner* — Hares Jami
(74) *Attorney, Agent, or Firm* — Finnegan, Henderson, Farabow, Garrett & Dunner, LLP

(57) ABSTRACT

The present disclosure relates to systems and methods for indexing and mapping data sets by feature matrices, comprising at least a processor and a non-transitory memory storing instructions that cause the processor to perform operations including receiving data sets of the same type, applying autoencoders to generate feature matrices, and generating a neural network model trained to generate synthetic data corresponding to the type of data files. Further, the processor performs operations to applying more autoencoders to part of the hidden layer of the neural network model to generate more corresponding feature matrices and indexing the data set using the feature matrices such that the data sets are searchable using an index wherein a search query is received and a third feature matrix is generated so that a data set can be retrieved and compared to the feature matrices using the index.

20 Claims, 9 Drawing Sheets

(56) References Cited

U.S. PATENT DOCUMENTS

2019/0012581 A1* 1/2019 Honkala .............. G06K 9/6212

OTHER PUBLICATIONS

Handong Zhao et al., "Multi-View Clustering via Deep Matrix Factorization," *Thirty-First AAAI Conference on Artificial Intelligence*, San Francisco, CA (2017), 7 pages.
Mart van Baalen, *Deep Matrix Factorization for Recommendation*, Master's Thesis, University of Amsterdam (2016), 110 pages.
Gintare Karolina Dziugaite et al., "Neural Network Matrix Factorization," arXiv (2015), retrieved from https://arxiv.org/pdf/1511.06443.pdf, 7 pages.
Wing W. Y. Ng et al., "Dual autoencoders features for imbalance classification problem," *Pattern Recognition*, vol. 60 (2016), 15 pages.

* cited by examiner

SYSTEMS AND METHODS FOR INDEXING AND MAPPING DATA SETS USING FEATURE MATRICES

TECHNICAL FIELD

The disclosed embodiments relate to a platform for indexing and mapping data sets using feature matrices. In particular, the disclosed embodiments relate to techniques for generating feature matrices for data sets using autoencoders applied to related neural networks. In addition, the disclosed embodiments may factorize the feature matrices for efficient searching of data sets.

BACKGROUND

Modern computing often uses a large number of data sets, whether text files, images, or other formats (such as portable document format (pdf), Microsoft Word® format, Microsoft Excel® format or the like). However, it is difficult and costly to maintain and store these data sets in a meaningful fashion. Indeed, conventionally, many data sets are lost on company-wide systems due to inability to effectively find and use sets, especially when data sets are dumped into a data lake rather than indexed and stored.

Moreover, traditional mechanisms of indexing data sets generally focus on the data sets themselves. However, this may limit the type of dimensions used to index, compare, and search the data sets. Embodiments of the present disclosure may solve these technical problems.

SUMMARY

Consistent with disclosed embodiments, systems, methods, and computer readable media are provided for indexing and mapping models by hyperparameters as well as searching indexed models.

The disclosed embodiments may include a system for indexing and mapping data sets by feature matrices. The system may comprise at least one processor and at least one non-transitory memory storing instructions that, when executed by the at least one processor cause the at least one processor to perform operations. The operations may comprise receiving at least one data set, the at least one data set comprising one or more files of a same type; applying one or more first autoencoders to the at least one data set to generate one or more corresponding first feature matrices; generating at least one neural network model trained to generate synthetic data corresponding to the type of the one or more files; applying one or more second autoencoders to at least a portion of at least one hidden layer of the at least one neural network model to generate one or more corresponding second feature matrices; indexing the at least one data set using the one or more first feature matrices and the one or more second feature matrices; and enabling searching for data sets using the index.

The disclosed embodiments may further include a system for indexing and mapping data sets by feature matrices. The system may comprise at least one processor and at least one non-transitory memory storing instructions that, when executed by the at least one processor cause the at least one processor to perform operations. The operations may comprise receiving at least one data set, the at least one data set comprising one or more files; applying one or more first autoencoders to the at least one data set to generate one or more corresponding first feature matrices; extracting metadata from the at least one data set; applying one or more second autoencoders to the extracted metadata to generate one or more corresponding second feature matrices; indexing the at least one data set using the one or more first feature matrices and the one or more second feature matrices; and enabling searching for data sets using the index.

The disclosed embodiments may further include a system for indexing and mapping data sets by feature matrices. The system may comprise at least one processor and at least one non-transitory memory storing instructions that, when executed by the at least one processor cause the at least one processor to perform operations. The operations may comprise receiving at least one data set, the at least one data set comprising one or more files of a same type; applying one or more first autoencoders to the at least one data set to generate one or more corresponding first feature matrices; generating at least one neural network model trained to generate synthetic data corresponding to the type of the one or more files; extracting at least one of weights or activation functions from one or more hidden layers of the generated at least one neural network; applying one or more second autoencoders to the extracted at least one of weights or activation functions to generate one or more corresponding second feature matrices; indexing the at least one data set using the one or more first feature matrices and the one or more second feature matrices; receiving a search query including at least one of a neural network model or a sample data set; generating one or more third feature matrices from the search query using at least one of the one or more first autoencoders or the one or more second autoencoders; and using the index, retrieve the at least one data set and a measure of comparison between the one or more third feature matrices and at least one of the one or more first feature matrices and the one or more second feature matrices.

The disclosed embodiments may further include a system for searching for data sets by factorized feature matrices. The system may comprise at least one processor and at least one non-transitory memory storing instructions that, when executed by the at least one processor cause the at least one processor to perform operations. The operations may comprise receiving at least one data set, the at least one data set comprising one or more files of a same type; determining first feature matrices corresponding to one or more autoencoders applied to the at least one data set; factorizing the first feature matrices to first decomposed matrices; determining second feature matrices corresponding to at least one hidden layer of at least one neural network associated with the at least one data set; factorizing the second feature matrices to second decomposed matrices; indexing the at least one data set using the first decomposed matrices and the second decomposed matrices; and enabling searching for data sets using the index.

The disclosed embodiments may further include a system for searching for data sets by factorized feature matrices. The system may comprise at least one processor and at least one non-transitory memory storing instructions that, when executed by the at least one processor cause the at least one processor to perform operations. The operations may comprise receiving at least one data set, the at least one data set comprising one or more files of a same type; determining first feature matrices corresponding to one or more autoencoders applied to the at least one data set; factorizing the first feature matrices to first decomposed matrices; determining second feature matrices corresponding to metadata associated with the at least one data set; factorizing the second feature matrices to second decomposed matrices; indexing the at least one data set using the first decomposed matrices and the second decomposed matrices; and enabling searching for data sets using the index.

The disclosed embodiments may further include a system for searching for data sets by factorized feature matrices. The system may comprise at least one processor and at least one non-transitory memory storing instructions that, when executed by the at least one processor cause the at least one processor to perform operations. The operations may comprise receiving at least one data set, the at least one data set comprising one or more files of a same type; determining first feature matrices corresponding to one or more autoencoders applied to the at least one data set; factorizing the first feature matrices to first decomposed matrices; determining second feature matrices corresponding to at least one of weights or activations functions of at least one hidden layer of at least one neural network associated with the at least one data set; factorizing the second feature matrices to second decomposed matrices; indexing the at least one data set using the first decomposed matrices and the second decomposed matrices; receiving a search query including at least one of a neural network model or a sample data set; generating one or more third feature matrices from the search query; factorizing the one or more third feature matrices to one or more third decomposed matrices; and using the index, retrieve the at least one data set and a measure of comparison between the one or more third decomposed matrices and at least one of the first decomposed matrices and the second decomposed matrices.

Consistent with other disclosed embodiments, non-transitory computer readable storage media may store program instructions, which are executed by at least one processor device and perform any of the methods described herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments consistent with the disclosure and, together with the description, serve to explain the principles of the disclosure. The drawings are not necessarily to scale or exhaustive. Instead, emphasis is generally placed upon illustrating the principles of the embodiments described herein. In the drawings.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus the materials, methods, and examples are illustrative only and are not intended to be necessarily limiting.

The disclosed embodiments can be used to automatically index and search data sets more accurately and robustly. Using autoencoders applied to both the data sets themselves as well as metadata or neural networks associated with the data sets, the disclosed embodiments can produce more detailed feature matrices and index the data sets using those features. In some aspects, the data sets may comprise unstructured data, such as one or more JSON (JavaScript Object Notation), one or more delimited files (e.g., comma-separated value (CSV) files or the like), or the like or structured data, such as one or more relational data structures (e.g., tabular data or the like), one or more graphical data structures, or the like. In various embodiments, the disclosed systems may use autoencoders in order to increase efficiency as compared with other techniques for generating feature matrices. In addition, the use of autoencoders provides for a fuzzier search than other techniques; accordingly, some embodiments may use factorized matrices to further increase efficiency without significant impacts on accuracy.

Figure 1:
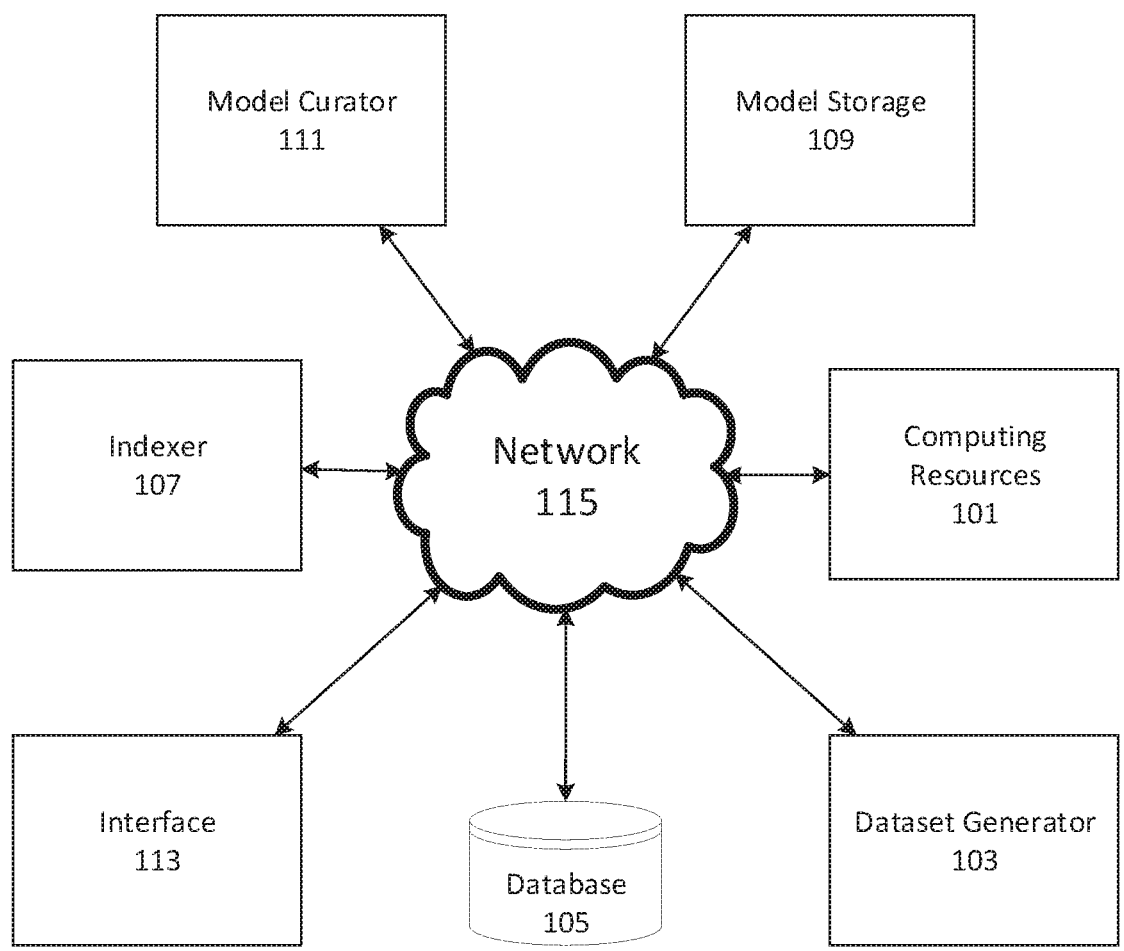
FIG. 1 depicts an exemplary cloud-computing environment for indexing and searching data sets, consistent with disclosed embodiments.

FIG. 1 depicts a cloud-computing environment 100 for indexing and searching data sets. Environment 100 can be configured to support indexing of data sets, searching and retrieval of data sets, training neural networks and other models on data sets, and imposition of rules on indexed data sets. Environment 100 can be configured to expose an interface for communication with other systems. Environment 100 can include computing resources 101, data set generator 103, database 105, indexer 107, model storage 109, model curator 111, and interface 113. These components of environment 100 can be configured to communicate with each other, or with external components of environment 100, using network 115. The particular arrangement of components depicted in FIG. 1 is not intended to be limiting. System 100 can include additional components, or fewer components. Multiple components of system 100 can be implemented using the same physical computing device or different physical computing devices.

Computing resources 101 can include one or more computing devices configurable to index and search data sets. The computing devices can be special-purpose computing devices, such as graphical processing units (GPUs) or application-specific integrated circuits. The cloud computing resources can be general-purpose computing devices. The computing devices can be configured to host an environment for indexing and searching data sets. For example, the computing devices can host virtual machines, pods, or containers. The computing devices can be configured to run applications for generating data models. For example, the computing devices can be configured to run SAGEMAKER, Tensorflow, or similar machine learning deployment and training applications or platforms. Computing resources 101 can be configured to receive models for training from model storage 109, or another component of system 100. Computing resources 101 can be configured to index and search data sets using feature matrices from autoencoders. For example, computing resources 101 may apply the autoencoders to the data sets themselves, to synthetic versions of the data sets, to metadata associated with the data sets, and/or to hidden layer(s) of neural network(s) trained to generate synthetic versions of the data sets.

Data set generator 103 can include one or more computing devices configured to generate data. Data set generator 103 can be configured to provide data to computing resources 101, database 105, to another component of system 100 (e.g., interface 113), or another system (e.g., an APACHE KAFKA cluster or other publication service). Data set generator 103 can be configured to receive data from database 105 or another component of system 100. Data set generator 103 can be configured to receive data models from model storage 109 or another component of system 100. In some embodiments, data set generator 103 can be configured to generate synthetic data. For example, data set generator 103 can be configured to generate synthetic data by identifying and replacing sensitive information in data received from database 103 or interface 113. As an additional example, data set generator 103 can be configured to generate synthetic data using a data model without reliance on input data. For example, the data model can be configured to generate data matching statistical and content characteristics of a training data set. In some aspects, the data model can be configured to map from a random or pseudorandom vector to elements in the training data space.

In any embodiments where data set generator 103 generates synthetic data, data set generator 103 may use one or more neural networks, e.g., retrieved from model storage 109, trained using stored data sets, or the like. Accordingly, data set generator 103 may generate data with the neural network(s) and/or provide the neural network(s) to indexer 107 for further processing.

Database 105 can include one or more databases configured to store indexed data sets for use by system 100. Additionally or alternatively, database 105 may store models associated with data sets. For example, database 105 may store models associated with generalized representations of those models (e.g., neural network architectures stored in TensorFlow or other standardized formats). The databases can include cloud-based databases (e.g., AMAZON WEB SERVICES S3 buckets) or on-premises databases. As explained above, the models may comprise one or more neural networks configured to generate synthetic data sets.

Indexer 107 can include one or more computing systems configured to index data models for system 100. For example, indexer 107 can be configured to apply autoencoders to generate feature matrices before indexing and subsequent searching thereof by computing resources 101. Indexer 107 may apply one or more first autoencoders to the data sets themselves, one or more second autoencoders to metadata associated with the data sets, and/or one or more third autoencoders to one or more hidden layers of one or more neural networks associated with the data sets. For example, metadata may include any supplemental data not comprising the structure or unstructured data of the set itself, such as dates and/or times of creation, dates and/or times of modification, authors, filenames, version numbers associated with applications generating the data set, or the like. The neural network(s) associated with the data sets may comprise one or more neural networks configured to parse the data (e.g., convert unstructured data of the set to structured data) or configured to generate synthetic data sets based on the input data sets. Applying autoencoders to the hidden layer(s) may comprise applying the autoencoders to weights, activation functions, or any other properties of nodes within the hidden layer(s). In some embodiments, indexer 107 may additionally or alternatively apply autoencoders to metadata associated with the neural network(s) and/or to synthetic data generated by the neural network(s).

Any of the autoencoders described above (e.g., the one or more first autoencoders, the one or more second autoencoders, the one or more third autoencoders, or the like) may overlap. For example, indexer 107 may apply one autoencoder applied to the data sets themselves and apply the same autoencoder to metadata, synthetic data, hidden layer(s) of neural network(s), or the like. Additionally or alternatively, indexer 107 may apply one autoencoder only to the data sets themselves or metadata, synthetic data, hidden layer(s) of neural network(s), or the like.

Indexer 107 can also be configured to search the indexed data sets based on instructions received from a user or another system. These instructions can be received through interface 113. For example, indexer 107 can be configured to receive a search query and retrieve data sets based on the query and using feature matrices generated by indexer 107 with computing resources 101.

Additionally or alternatively, indexer 107 can be configured to apply one or more autoencoders (e.g., one or more of the autoencoders applied to the data sets, synthetic data, neural networks, and/or metadata, as described above) to the query in order to search the indexed data sets using feature matrices. In some embodiments, indexer 107 can be configured to further factorize the feature matrices for the data sets before indexing as well as the feature matrices associated with the query. The factorization can be based on linear equations (e.g., lower-upper decomposition, lower-upper reduction, rank factorization, Cholesky decomposition, QR decomposition, or the like), eigenvalues (e.g., eigendecomposition, Jordan decomposition, Schur decomposition, QZ decomposition, or the like) or other factorization techniques (e.g., polar decomposition, Sinkhorn normal decomposition, or the like).

Model storage 109 can include one or more databases configured to store data models associated with the data sets. For example, the data models may comprise parsing models, synthetic data generation models, or the like. Model storage 109 can be configured to provide information regarding available data models to a user or another system (e.g. indexer 107). This information can be provided using interface 113. The databases can include cloud-based databases (e.g., AMAZON WEB SERVICES S3 buckets) or on-premises databases. The information can include metadata associated with the models, as explained above.

Model curator 111 can be configured to train the models stored in storage 109. For example, model curator 111 can be configured to train neural networks to parse data sets and/or generate synthetic data sets, as explained above. Training may use the data sets as input and include modification of weights and/or activation functions of nodes within the neural network to reduce one or more associated loss functions.

Interface 113 can be configured to manage interactions between system 100 and other systems using network 115. In some aspects, interface 113 can be configured to publish data received from other components of system 100 (e.g., data set generator 103, computing resources 101, database 105, or the like). This data can be published in a publication and subscription framework (e.g., using APACHE KAFKA), through a network socket, in response to queries from other systems, or using other known methods. The data can be synthetic data, as described herein. As an additional example, interface 113 can be configured to provide results from indexed data sets in database 105 in response to a query received via interface 113. In various aspects, interface 113 can be configured to provide data or instructions received from other systems to components of system 100. For example, interface 113 can be configured to receive instructions for retrieving data sets (e.g., according to a query of indexed feature matrices or factorized matrices) from another system and provide this information to indexer 107. As an additional example, interface 113 can be configured to receive data including sensitive portions from another system (e.g. in a file, a message in a publication and subscription framework, a network socket, or the like) and provide that data to data set generator 103 or database 105.

Network 115 can include any combination of electronics communications networks enabling communication between components of system 100. For example, network 115 may include the Internet and/or any type of wide area network, an intranet, a metropolitan area network, a local area network (LAN), a wireless network, a cellular communications network, a Bluetooth network, a radio network, a device bus, or any other type of electronics communications network know to one of skill in the art.

Disclosed herein are improved systems and methods for efficiently searching and indexing data sets. In some embodiments, hidden layers of data models related to the data sets may be used to index the data sets. For example, one or more autoencoders may generate feature matrices based on the hidden layers, as explained above.

These data models may generate synthetic data. For example, the data models may be trained using the data sets to generate synthetic data sets with structural similarities to the data sets used for training. Additionally or alternatively, these data models may parse unstructured data to generate structured data. As used herein, "unstructured" does not necessarily refer to data that is haphazard or lacking in discernible patterns. Rather, "unstructured" data may refer to data stored without logical connection among portions even if the data is stored, for example, as a text file with a pattern and delimiter that impart meaning to the data even though no logical connection is stored. Accordingly, the "structure" of any unstructured data may comprise patterns, delimiters, and other components of the data that impart meaning.

Figure 2A:
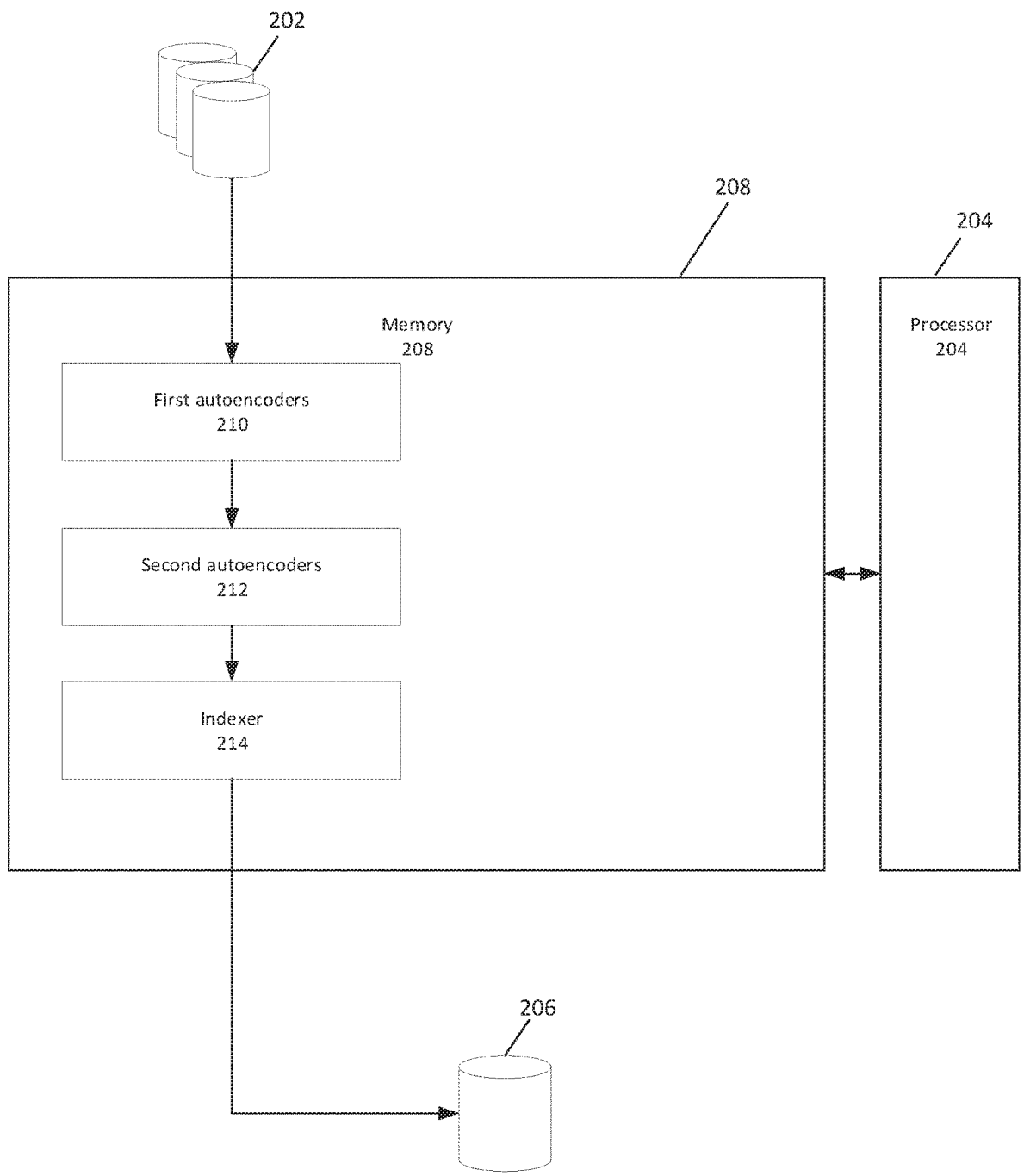
FIG. 2A depicts an exemplary system for indexing data sets using autoencoders, consistent with disclosed embodiments.

FIG. 2A depicts an exemplary system 200 for indexing data sets, consistent with disclosed embodiments. System 200 may include one or more databases 202, one or more processors 204, and one or more databases 206. The one or more processors may execute one or more programs (e.g., first autoencoders 210, second autoencoders 212, and indexer 214) for indexing data sets. The one or more programs may be stored in a memory 208, as depicted in FIG. 2A. System 200 may be implemented as a component of system 100 or may be a system separate from system 100.

Databases 202 may include one or more databases configured to store data sets for use by system 200. In some embodiments, databases 202 may be included in database 115 of system 100. Databases 202 can include cloud-based databases (e.g., AMAZON WEB SERVICES S3 buckets) and/or on-premises databases. In some embodiments, databases 202 may additionally store data models for parsing the data sets (e.g., from unstructured data to structured data) or for generating synthetic data sets.

Databases 206 may also include one or more databases configured to store data for use by system 200. Databases 206 can include cloud-based databases (e.g., AMAZON WEB SERVICES S3 buckets) and/or on-premises databases. In some embodiments, databases 206 may store training data for the data models and/or indexing information associated with the data sets. Database 206 may be included as a part of previously described database 115.

First autoencoders 210 may receive one or more data sets from databases 202. The one or more data sets may include text files (e.g., logs generated by one or more applications), image files, or any other set of unstructured or structured data. First autoencoders 210 may generate one or more feature matrices for each received data set. In an embodiment, first autoencoders 210 may include one or more feedforward, non-recurrent neural networks, or the like. For example, first autoencoders 210 may use linear activations and/or comprise a single sigmoid hidden layer, thus generating one or more feature matrices related to solutions in principal component analysis (PCA). Additionally or alternatively, first autoencoders 210 may use other activations and a plurality of hidden layers. For example, first autoencoders 210 may comprise two hidden layers functioning as a restricted Boltzmann machine.

Although not depicted in FIG. 2A, processor 204 may further train and/or re-train first autoencoders 210 before application to the received data set(s). For example, processor 204 may use training data (e.g., from database(s) 206) and/or the received data set(s) to train first autoencoders 210. In embodiments where training data is used, processor 204 may further use the received data set(s) to re-train first autoencoders 210.

Second autoencoders 212 may receive one or more data models associated with the received data set(s) from databases 202. The one or more data models may include one or more linear regressions, neural networks, or the like that parse unstructured data (e.g., of the received data set(s)) into structured data. Additionally or alternatively, the one or more data models may include one or more linear regressions, neural networks, or the like that generate synthetic data with one or more structural similarities to the received data set(s). As used herein, a structural similarity may refer to any similarity in organization (e.g., one or more overlapping columns, form fields, or the like), any similarity in statistical measures (e.g., statistical distribution of letters, numbers, pixels, or the like), or the like.

In any of the embodiments described above, the model(s) may include statistical algorithms. For example, the model(s) may include regression models that estimate the relationships among variables associated with the received data set(s) and generate synthetic sets based thereon. In some aspects, the model(s) may additionally or alternatively sort elements of the received data set(s) using one or more classifiers to determine probabilities used to generate synthetic data sets based thereon. The model(s) may be parametric, non-parametric, and/or semi-parametric.

In some embodiments, the model(s) may include a convolutional neural network model. The convolutional neural network may comprise an input layer, one or more middle layers, and one or more output layers. In some embodiments, the input layer may comprise multiple matrices (e.g., a matrix for pixel values in an image, a matrix for characters in an input string, or the like). Alternatively, the input layer may comprise a single matrix (e.g., a single matrix of pixel brightness values, a single matrix of character distributions, or the like). In some aspects, one or more middle layers and/or the output layer may be a deterministic function of the values of the preceding layer.

The convolutional neural network may include one or more convolutional layers. A convolutional layer may be configured to convolve one or more spatial filters with the convolutional layer input to generate a convolutional layer output tensor. One or more spatial filter functions may be defined by a matrix of weights to be applied to the elements of the preceding layer during a convolution operation, an offset, and/or an activation function. Training the convolutional neural network may comprise modifying the weights and offsets using a backpropagation algorithm. In some embodiments, the convolutional neural network may also include pooling layers and/or fully connected layers.

Additionally or alternatively, the model(s) may include a deep fully connected neural network. The deep fully connected neural network may comprise an input layer, one or more middle layers, and one or more output layers. The middle layer(s) may be fully connected. Accordingly, one or more middle layers may have a plurality of neurons (or nodes), the neurons being connected to one or more (or all) neurons of the previously layer.

Additionally or alternatively, the model(s) may include a recurrent neural network. The recurrent neural network may comprise an input layer, one or more middle layers, and one or more output layers. The middle layer(s) may include a plurality of neurons (or nodes) that use input from one or more neurons of a previous layer in combination with previous (in time) states and/or outputs of the neuron itself.

Although the above examples include neural networks, other embodiments may include additional or alternative models. For example, additionally or alternatively, the model(s) may include Random Forests, composed of a combination of decision trees. Such decision trees may comprise a data structure mapping observations about an input, in the "branch" of the tree, to conclusions about a target value, in the "leaves" of the tree. In such aspects, the conclusions may be used to generate synthetic data based on the observations about the input. An individual tree may depend on the values of a random vector sampled independently and with the same distribution for a plurality of (or all) trees in the forest. Any other machine learned models may be applied in addition to or in lieu of a Random Forest model.

Second autoencoders 212 may generate one or more feature matrices for each received data model. For example, second autoencoders 212 may generate one or more feature matrices based on hidden layer(s) of each received data model. In such an example, second autoencoders 212 may accept weights and/or activation functions of the hidden layer(s) as input.

Similar to first autoencoders 210, second autoencoders 212 may include one or more feedforward, non-recurrent neural networks, or the like. For example, second autoencoders 212 may use linear activations and/or comprise a single sigmoid hidden layer, thus generating one or more feature matrices related to solutions in principal component analysis (PCA). Additionally or alternatively, second autoencoders 212 may use other activations and a plurality of hidden layers. For example, second autoencoders 212 may comprise two hidden layers functioning as a restricted Boltzmann machine.

Although not depicted in FIG. 2A, processor 204 may further train and/or re-train second autoencoders 212 before application to the received data model(s). For example, processor 204 may use training data (e.g., from database(s) 206) and/or the received data model(s) to train second autoencoders 212. In embodiments where training data is used, processor 204 may further use the received data model(s) to re-train first autoencoders 212.

In addition to or in lieu of application to hidden layer(s), second autoencoders 212 may generate one or more feature matrices based on metadata. For example, second autoencoders 212 may generate the one or more feature matrices based on metadata associated with the received data set(s). Such embodiments may thus omit the data model(s) described above. Additionally or alternatively, second autoencoders 212 may generate the one or more feature matrices based on metadata associated with the received data model(s) and/or based on synthetic data sets generated by the received data model(s).

Indexer 214 may index the received data set(s) by the feature matrices from first autoencoders 210 and the feature matrices from second autoencoders 212. Accordingly, indexer 214 may generate a relational mapping, a graphical mapping, or any other index configured for use to search the received data set(s) based on the feature matrices from first autoencoders 210 and the feature matrices from second autoencoders 212.

Although not depicted in FIG. 2A, processor 204 may further factorize the feature matrices from first autoencoders 210 and/or the feature matrices from second autoencoders 212 before indexing. In such embodiments, indexer 214 may index the received data set(s) using the factorized matrices in addition to or in lieu of the feature matrices themselves. As explained above, processor 204 may factorize using linear equations (e.g., lower-upper decomposition, lower-upper reduction, rank factorization, Cholesky decomposition, QR decomposition, or the like), eigenvalues (e.g., eigendecomposition, Jordan decomposition, Schur decomposition, QZ decomposition, or the like) or any other factorization techniques (e.g., polar decomposition, Sinkhorn normal decomposition, or the like).

As further depicted in FIG. 2A, the indexed data sets may be output for storage, e.g., in databases 206. Additionally or alternatively, the indexed data sets may be output to an external device, e.g., another server, a third party data repository (e.g., AMAZON WEB SERVICES S3 buckets), a user such an administrator diagnosing a problem, or the like.

Figure 2B:
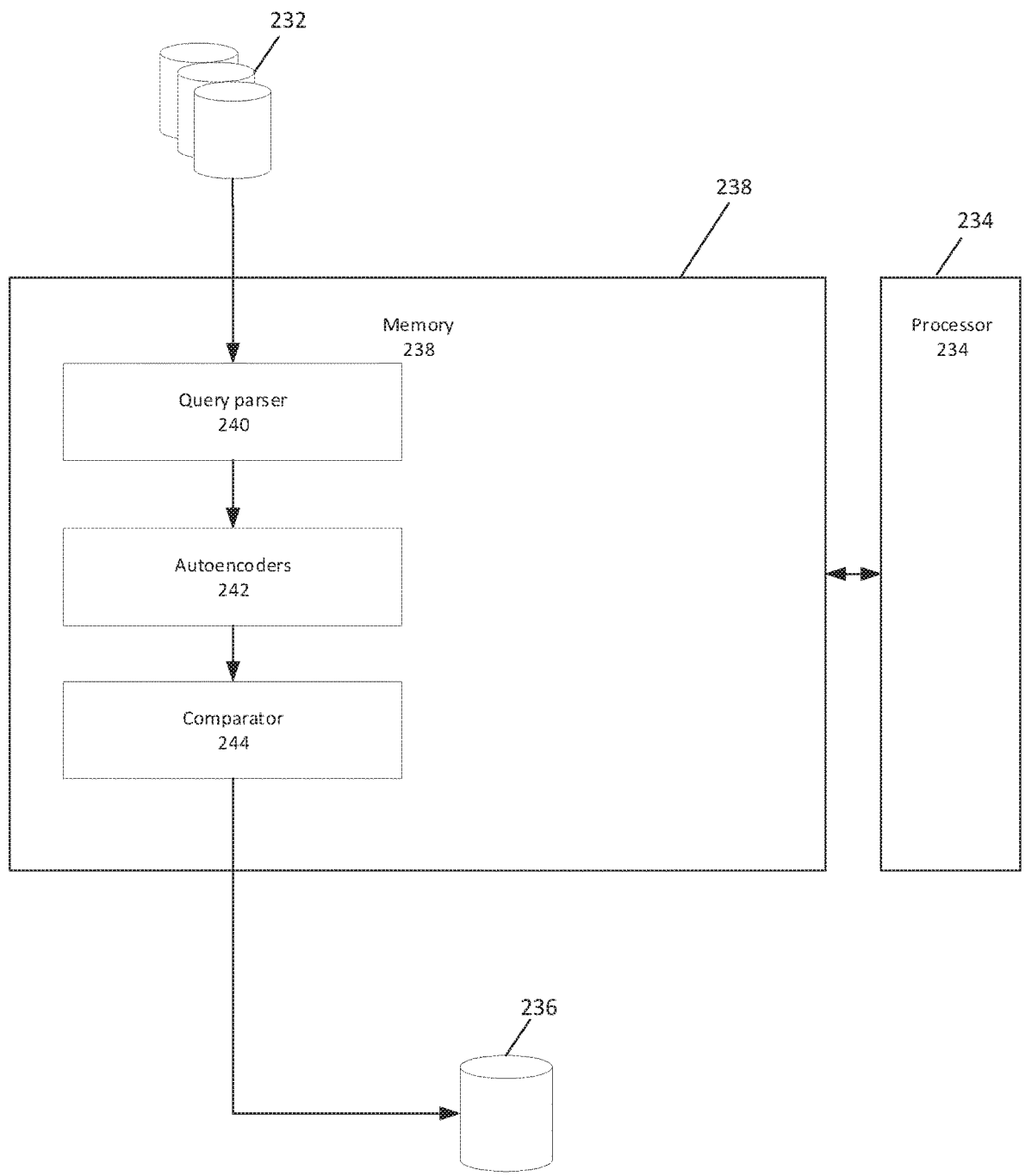
FIG. 2B depicts an exemplary system for searching data sets using feature matrices from autoencoders, consistent with disclosed embodiments.

FIG. 2B depicts an exemplary system 230 for searching and comparing data sets, consistent with disclosed embodiments. System 230 may include one or more databases 232, one or more processors 234, and one or more databases 236. The one or more processors may execute one or more programs (e.g., query parser 240, autoencoders 242, and comparator 244) for indexing data sets. The one or more programs may be stored in a memory 238, as depicted in FIG. 2B. System 230 may be implemented as a component of system 100 or may be a system separate from system 100.

Databases 232 may include one or more databases configured to store data sets for use by system 230. In some embodiments, databases 232 may be included in database 115 of system 100. Databases 232 can include cloud-based databases (e.g., AMAZON WEB SERVICES S3 buckets) and/or on-premises databases. In some embodiments, databases 232 may additionally store data models for parsing the data sets (e.g., from unstructured data to structured data) or for generating synthetic data sets.

Databases 236 may also include one or more databases configured to store data for use by system 200. Databases 236 can include cloud-based databases (e.g., AMAZON WEB SERVICES S3 buckets) and/or on-premises databases. In some embodiments, databases 236 may store training data for the data models and/or indexing information associated with the data sets. Database 236 may be included as a part of previously described database 115.

Query parser 240 may receive a query for data sets. Although depicted as from databases 232 in FIG. 2B, query parser 240 may receive the query from an interface (not shown) connected to system 230. The query may include an example data set for which similar data sets are sought, one or more statistical measures or other structural descriptions of which data sets are sought, or any other information from which system 230 may retrieve one or more data sets.

Additionally or alternatively, the query may include one or more data models for which relevant data sets are sought. one or more data models associated with the received data set(s) from databases 232. The one or more data models may include one or more linear regressions, neural networks, or the like that parse unstructured data (e.g., of the sought data set(s)) into structured data. Additionally or alternatively, the one or more data models may include one or more linear regressions, neural networks, or the like that generate synthetic data with one or more structural similarities to the sought data set(s). As explained above, a structural similarity may refer to any similarity in organization (e.g., one or more overlapping columns, form fields, or the like), any similarity in statistical measures (e.g., statistical distribution of letters, numbers, pixels, or the like), or the like.

In any of the embodiments described above, the model(s) may include statistical algorithms. For example, the model (s) may include regression models that estimate the relationships among variables associated with the sought data set(s) and generate synthetic sets based thereon. In some aspects, the model(s) may additionally or alternatively sort elements of the sought data set(s) using one or more classifiers to determine probabilities used to generate synthetic data sets based thereon. The model(s) may be parametric, non-parametric, and/or semi-parametric.

In some embodiments, the model(s) may include a convolutional neural network model. The convolutional neural network may comprise an input layer, one or more middle layers, and one or more output layers. In some embodiments, the input layer may comprise multiple matrices (e.g., a matrix for pixel values in an image, a matrix for characters in an input string, or the like). Alternatively, the input layer may comprise a single matrix (e.g., a single matrix of pixel brightness values, a single matrix of character distributions, or the like). In some aspects, one or more middle layers and/or the output layer may be a deterministic function of the values of the preceding layer.

The convolutional neural network may include one or more convolutional layers. A convolutional layer may be configured to convolve one or more spatial filters with the convolutional layer input to generate a convolutional layer output tensor. One or more spatial filter functions may be defined by a matrix of weights to be applied to the elements of the preceding layer during a convolution operation, an offset, and/or an activation function. Training the convolutional neural network may comprise modifying the weights and offsets using a backpropagation algorithm. In some embodiments, the convolutional neural network may also include pooling layers and/or fully connected layers.

Additionally or alternatively, the model(s) may include a deep fully connected neural network. The deep fully connected neural network may comprise an input layer, one or more middle layers, and one or more output layers. The middle layer(s) may be fully connected. Accordingly, one or more middle layers may have a plurality of neurons (or nodes), the neurons being connected to one or more (or all) neurons of the previously layer.

Additionally or alternatively, the model(s) may include a recurrent neural network. The recurrent neural network may comprise an input layer, one or more middle layers, and one or more output layers. The middle layer(s) may include a plurality of neurons (or nodes) that use input from one or more neurons of a previous layer in combination with previous (in time) states and/or outputs of the neuron itself.

Although the above examples include neural networks, other embodiments may include additional or alternative models. For example, additionally or alternatively, the model(s) may include Random Forests, composed of a combination of decision trees. Such decision trees may comprise a data structure mapping observations about an input (e.g., the sought data set(s)), in the "branch" of the tree, to conclusions about a target value, in the "leaves" of the tree. In such aspects, the conclusions may be used to generate synthetic data based on the observations about the input. An individual tree may depend on the values of a random vector sampled independently and with the same distribution for a plurality of (or all) trees in the forest. Any other machine learned models may be applied in addition to or in lieu of a Random Forest model.

Autoencoders 242 may generate one or more feature matrices based on the query. In embodiments where the query includes one or more models, autoencoders 242 may generate one or more feature matrices based on hidden layer(s) of each data model in the query. In such an example, autoencoders 242 may accept weights and/or activation functions of the hidden layer(s) as input.

Autoencoders 242 may comprise the first autoencoders 210 of system 200, the second autoencoders 212 of system 200, autoencoders not included in first autoencoders 210 or second autoencoders 212, or any combination thereof. Accordingly, autoencoders 242 may include one or more feedforward, non-recurrent neural networks, or the like. For example, autoencoders 242 may use linear activations and/or comprise a single sigmoid hidden layer, thus generating one or more feature matrices related to solutions in principal component analysis (PCA). Additionally or alternatively, autoencoders 242 may use other activations and a plurality of hidden layers. For example, autoencoders 242 may comprise two hidden layers functioning as a restricted Boltzmann machine.

Although not depicted in FIG. 2B, processor 234 may further train and/or re-train autoencoders 242 before application to the query. For example, processor 234 may use training data (e.g., from database(s) 236) and/or the received query to train autoencoders 242. In embodiments where training data is used, processor 234 may further use the received query to re-train autoencoders 242.

In embodiments where the query includes metadata (e.g., in addition to or in lieu of an example data set, a data model, or the like), autoencoders 242 may generate one or more feature matrices based on the metadata. Additionally or alternatively, the query may include synthetic data and, accordingly, autoencoders 242 may generate one or more feature matrices based on the synthetic data.

Using the feature matrices from autoencoders 242, processor 234 may retrieve indexed data sets matching the query, e.g., from database(s) 232 and/or database(s) 236. As used herein, matching may include a perfect match or a fuzzy match. A fuzzy match may be found using similarities between feature matrices in the index and the one or more feature matrices from autoencoders 242 without a perfect match. For example, one or more vectors or other components of the feature matrices in the index may be within a threshold distance of corresponding vectors or other components of the one or more feature matrices from autoencoders 242.

In some embodiments, system 230 may output the retrieved data set(s) without further processing. In other embodiments, comparator 244 may further generate one or more measures of matching between the query and the retrieved data set(s), e.g., in embodiments using fuzzy matching. For example, a measure of matching may comprise one or more composite scores based on distances between one or more vectors or other components of the feature matrices associated with the retrieved set(s) and corresponding vectors or other components of the one or more feature matrices from autoencoders 242.

Additionally or alternatively, comparator 244 may cluster one or more vectors or other components of the feature matrices associated with the retrieved set(s) and corresponding vectors or other components of the one or more feature matrices from autoencoders 242. For example, comparator 244 may apply one or more thresholds to one or more vectors or other components of the feature matrices associated with the retrieved set(s), corresponding vectors or other components of the one or more feature matrices from autoencoders 242, or distances therebetween in order to classify the retrieved data set(s) into one or more clusters. Additionally or alternatively, comparator 244 may apply hierarchical clustering, centroid-based clustering, distribution-based clustering, density-based clustering, or the like to the one or more vectors or other components of the feature matrices associated with the retrieved set(s), the corresponding vectors or other components of the one or more feature matrices from autoencoders 242, or the distances therebetween. In any of the embodiments described above, comparator 244 may perform fuzzy clustering such that each retrieved data set has an associated score (such as 3 out of 5, 22.5 out of 100, a letter grade such as 'A' or 'C,' or the like) indicating a degree of belongingness in each cluster. The measures of matching may then be based on the clusters (e.g., distances between a cluster including the query and clusters including the retrieved data set(s) or the like).

Although depicted as a software module in FIG. 2B, comparator 244 may additionally or alternatively be implemented as one or more hardware comparators.

As depicted in FIG. 2B, the results (e.g., the retrieved data set(s), optionally with one or more determined measures of matching) may be output for storage, e.g., in databases 206. Additionally or alternatively, the results may be output to an external device, e.g., another server, a third party data repository (e.g., AMAZON WEB SERVICES S3 buckets), a user such an administrator diagnosing a problem, or the like. For example, the results may be output using one or more graphical user interfaces (GUIs), such as those depicted in FIGS. 4 and 5.

Figure 3:
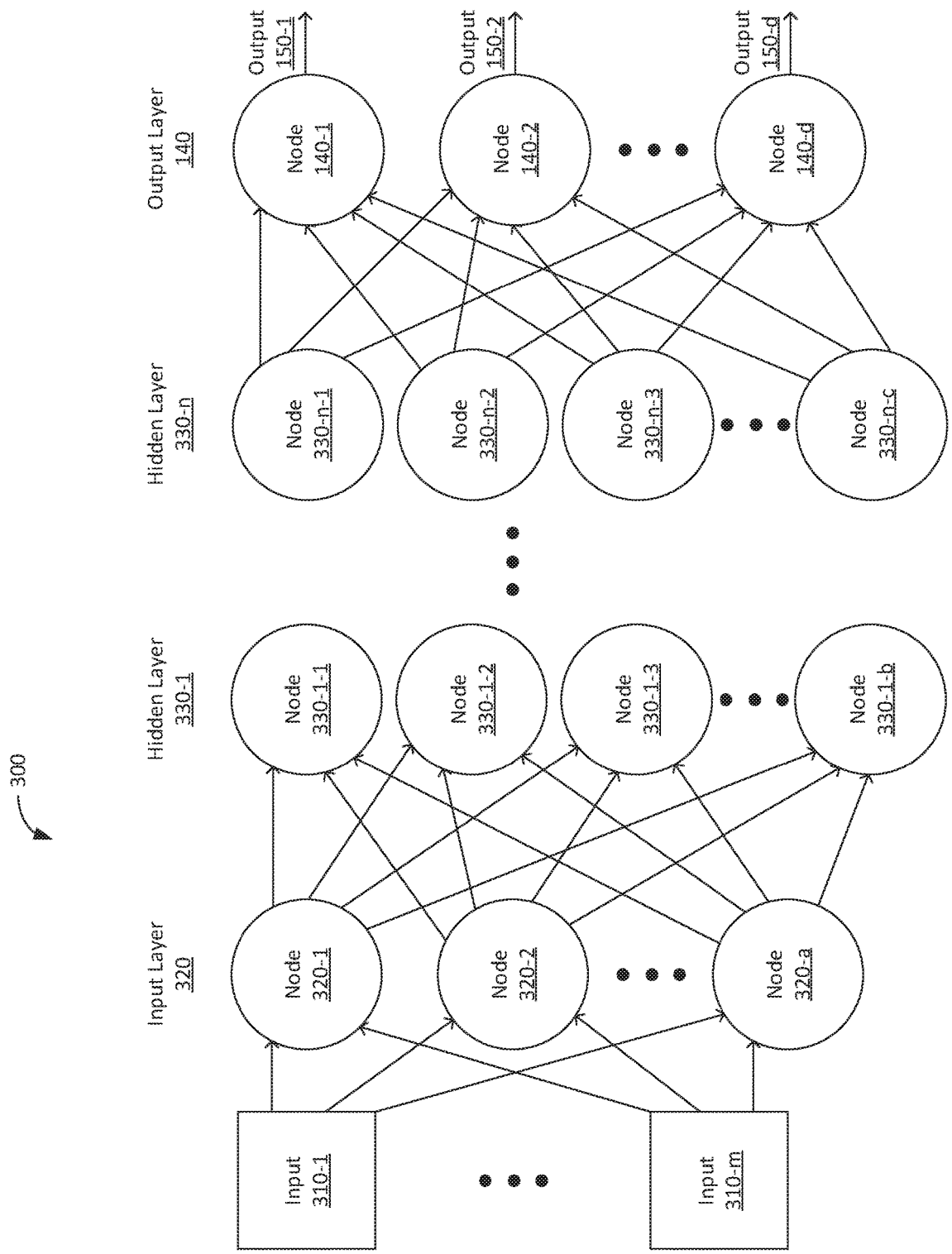
FIG. 3 depicts an exemplary neural network having at least one hidden layer for autoencoding, consistent with disclosed embodiments.

FIG. 3 is an illustration of exemplary neural network 300 having at least one hidden layer. As depicted in FIG. 3, neural network 300 may include an input layer 320 that accepts inputs, e.g., input 310-1, . . . , input 310-$m$. Inputs may include an image, text, or any other structure or unstructured data for processing by neural network 300. In some embodiments, neural network 300 may accept a plurality of inputs simultaneously. For example, in FIG. 3, neural network 300 may accept up to m inputs simultaneously. Additionally or alternatively, input layer 320 may accept up to m inputs in rapid succession, e.g., such that input 310-1 is accepted by input layer 320 in one cycle, a second input is accepted by input layer 320 in a second cycle in which input layer 320 pushes data from input 310-1 to a first hidden layer, and so on.

Input layer 320 may comprise one or more nodes, e.g., node 320-1, node 320-2, . . . , node 320-$a$. Each node may apply an activation function to corresponding input (e.g., one or more of input 310-1, . . . , input 310-$m$) and weight the output from the activation function by a particular weight associated with the node. An activation function may comprise a Heaviside step function, a Gaussian function, a multiquadratic function, an inverse multiquadratic function, a sigmoidal function, or the like. A weight may comprise a positive value between 0.0 and 1.0 or any other numerical value configured to allow some nodes in a layer to have corresponding output scaled more or less than output corresponding to other nodes in the layer.

As further depicted in FIG. 3, neural network 300 may include one or more hidden layers, e.g., hidden layer 330-1, . . . , hidden layer 330-$n$. Each hidden layer may comprise one or more nodes. For example, in FIG. 3, hidden layer 330-1 comprises node 330-1-1, node 330-1-2, node 330-1-3, . . . , node 330-1-$b$, and hidden layer 330-$n$ comprises node 330-$n$-1, node 330-$n$-2, node 130-$n$-3, . . . , node 330-$n$-$c$. Similar to nodes of input layer 320, nodes of the hidden layers may apply activation functions to output from connected nodes of the previous layer and weight the output from the activation functions by particular weights associated with the nodes. As explained above with respect to FIGS. 2A and 2B, these hidden layers may be used by autoencoders to generate feature matrices.

As further depicted in FIG. 3, neural network 300 may include an output layer 340 that finalizes outputs, e.g., output 350-1, output 350-2, . . . , output 350-$d$. Output layer 340 may comprise one or more nodes, e.g., node 340-1, node 340-2, . . . , node 340-$d$. Similar to nodes of input layer 320 and of the hidden layers, nodes of output layer 340 may apply activation functions to output from connected nodes of the previous layer and weight the output from the activation functions by particular weights associated with the nodes. In some embodiments, output layer 340 may generate structure versions of data input to input layer 320. In other embodiments, output layer 340 may generate synthetic versions of data input to input layer 320.

Although depicted as fully connected in FIG. 3, the layers of neural network 300 may use any connection scheme. For example, one or more layers (e.g., input layer 320, hidden layer 330-1, . . . , hidden layer 330-$n$, output layer 340, or the like) may be connected using a convolutional scheme, a sparsely connected scheme, or the like. Such embodiments may use fewer connections between one layer and a previous layer than depicted in FIG. 3.

Figure 4:
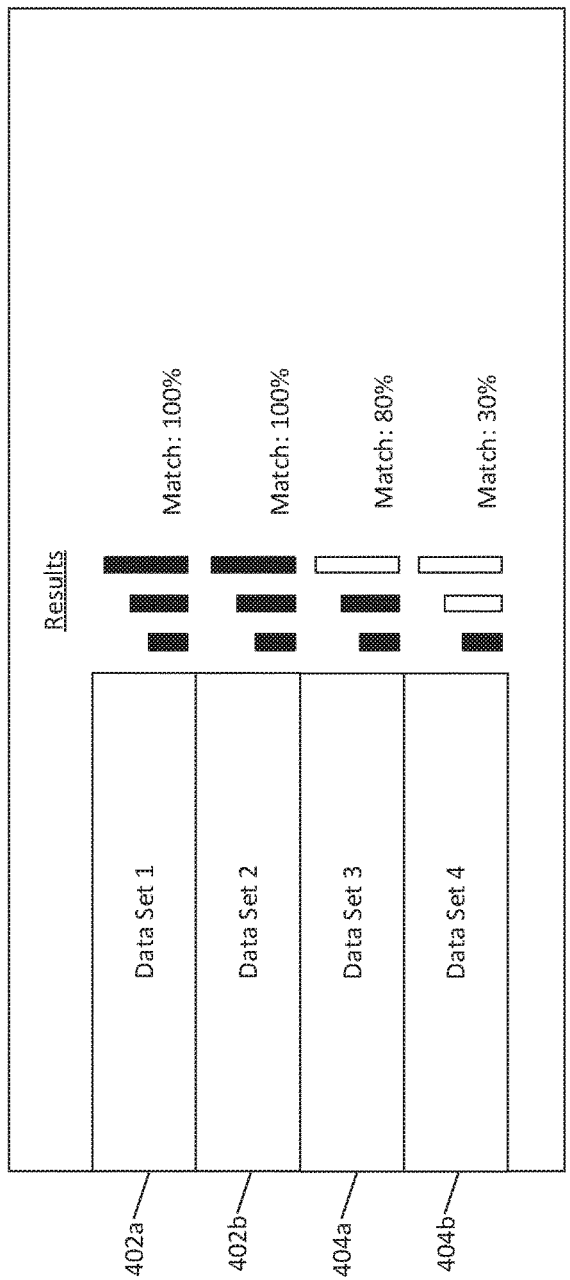
FIG. 4 depicts an exemplary graphical user interface showing results of a search of data sets, consistent with disclosed embodiments.

FIG. 4 is an illustration of exemplary graphical user interface 400 for showing results of a search of indexed data sets. As depicted in FIG. 4, interface 400 may include a list of results, such as result 402$a$ (data set 1 in the example of FIG. 4), result 402$b$ (data set 2 in the example of FIG. 4), result 404$a$ (data set 3 in the example of FIG. 4), and result 404$b$ (data set 4 in the example of FIG. 4). For example, indexer 214 may have indexed a plurality of data sets such that, in response to a query, system 200 may extract results 402a, 402b, 404a, and 404b. As depicted in FIG. 4, the results may be ranked by a measure of matching to the query. Additionally or alternatively, results 402a, 402b, 404a, and 404b may be ranked alphabetically, randomly, by date (newer or older) added to a database by indexer 214, or the like.

Moreover, interface 400 may include visual indicators of a measure of matching for results 402a, 402b, 404a, and 404b. For example, comparator 244 may have clustered a plurality of data sets such that, in response to the query, system 200 may extract data sets 402a and 402b as matches and data sets 404a and 404b as related models. In one example, results 404a and 404b may be located in the same cluster (or a neighboring cluster) as result 402a and/or result 402b. In the example of FIG. 4, related data set 404a is above related data set 404b in order to indicate that model 404a is more closely related to data set 402a and/or data set 402b than data set 404b. Additionally or alternatively, related data sets 404a and 404b may be ranked alphabetically, randomly, by date (newer or older) added to a database by indexer 214, or the like.

Figure 5:
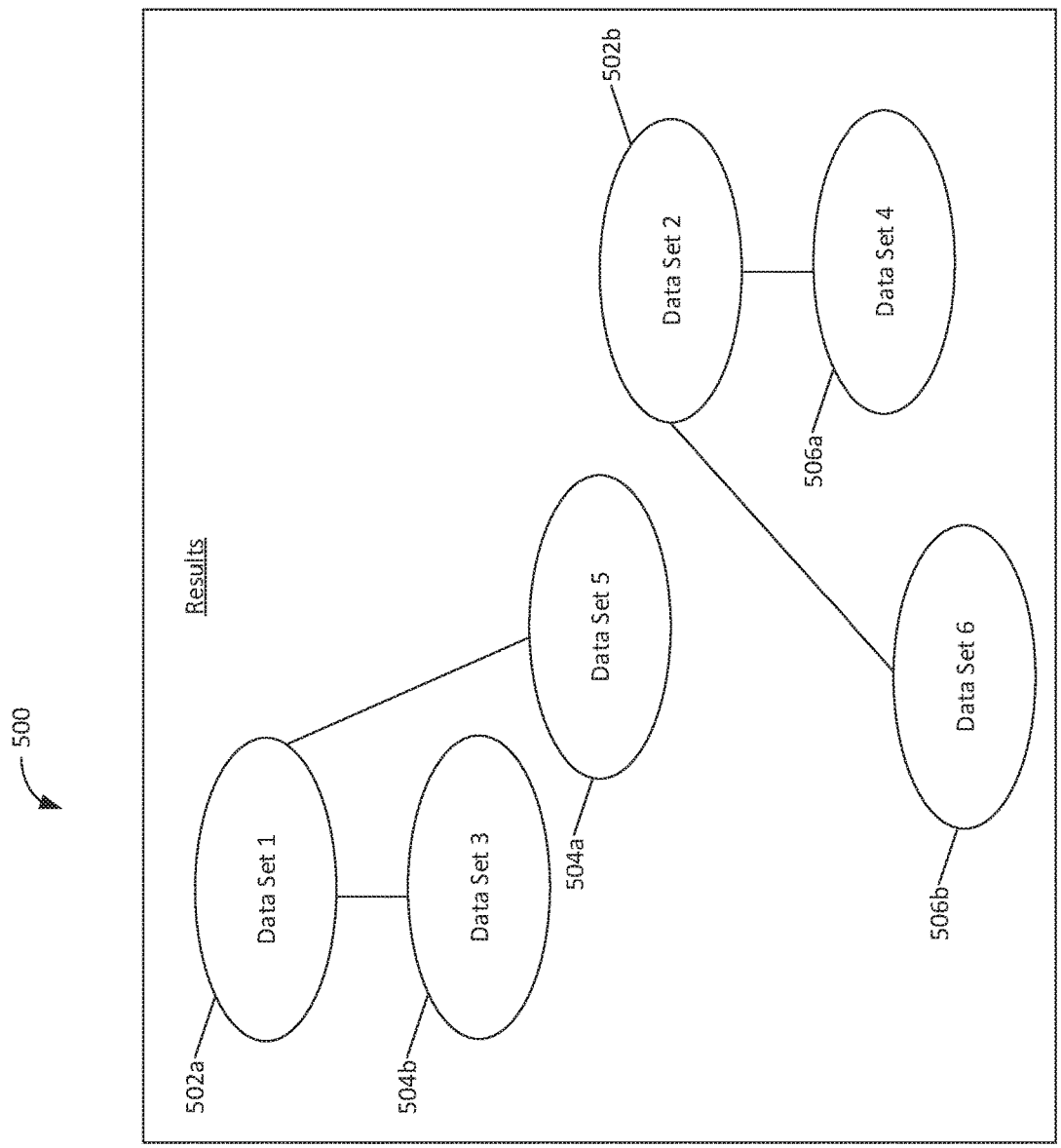
FIG. 5 depicts yet another exemplary graphical user interface showing results of a search of data sets, consistent with disclosed embodiments.

FIG. 5 is an illustration of exemplary graphical user interface 500 for showing results of a search of indexed data sets. As depicted in FIG. 5, interface 500 may include a graph of results, such as result 502a (data set 1 in the example of FIG. 5) and result 502b (data set 2 in the example of FIG. 5). Interface 500 may further include a related data set 504a (data set 5 in the example of FIG. 5) and a related data set 504b (data set 3 in the example of FIG. 5) related to data set 502a, and a related data 506a (data set 4 in the example of FIG. 5) and a related data set 506b (data set 6 in the example of FIG. 5) related to result 502b. For example, indexer 214 may have indexed a plurality of models such that, in response to a query, system 200 may extract results 502a and 502b.

Moreover, interface 500 may encode measures of matching for related data sets 504a, 504b, 506a, and 506b. For example, indexer 214 may have clustered a plurality of data sets such that, in response to the query, system 200 may extract results 502a and 502b as matches, data sets 504a and 504b as related to result 502a, and data sets 506a and 506b as related to result 502b. In one example, models 504a and 504b may be located in the same cluster (or a neighboring cluster) as result 502a, and models 506a and 506b may be located in the same cluster (or a neighboring cluster) as result 502b. In the example of FIG. 5, related model 504b is graphically closer to result 502a in order to indicate that model 504b is more closely related to result 502a than model 504a. Similarly, related model 506a is graphically closer to result 502b in order to indicate that model 506a is more closely related to result 502b than model 506b.

Figure 6:
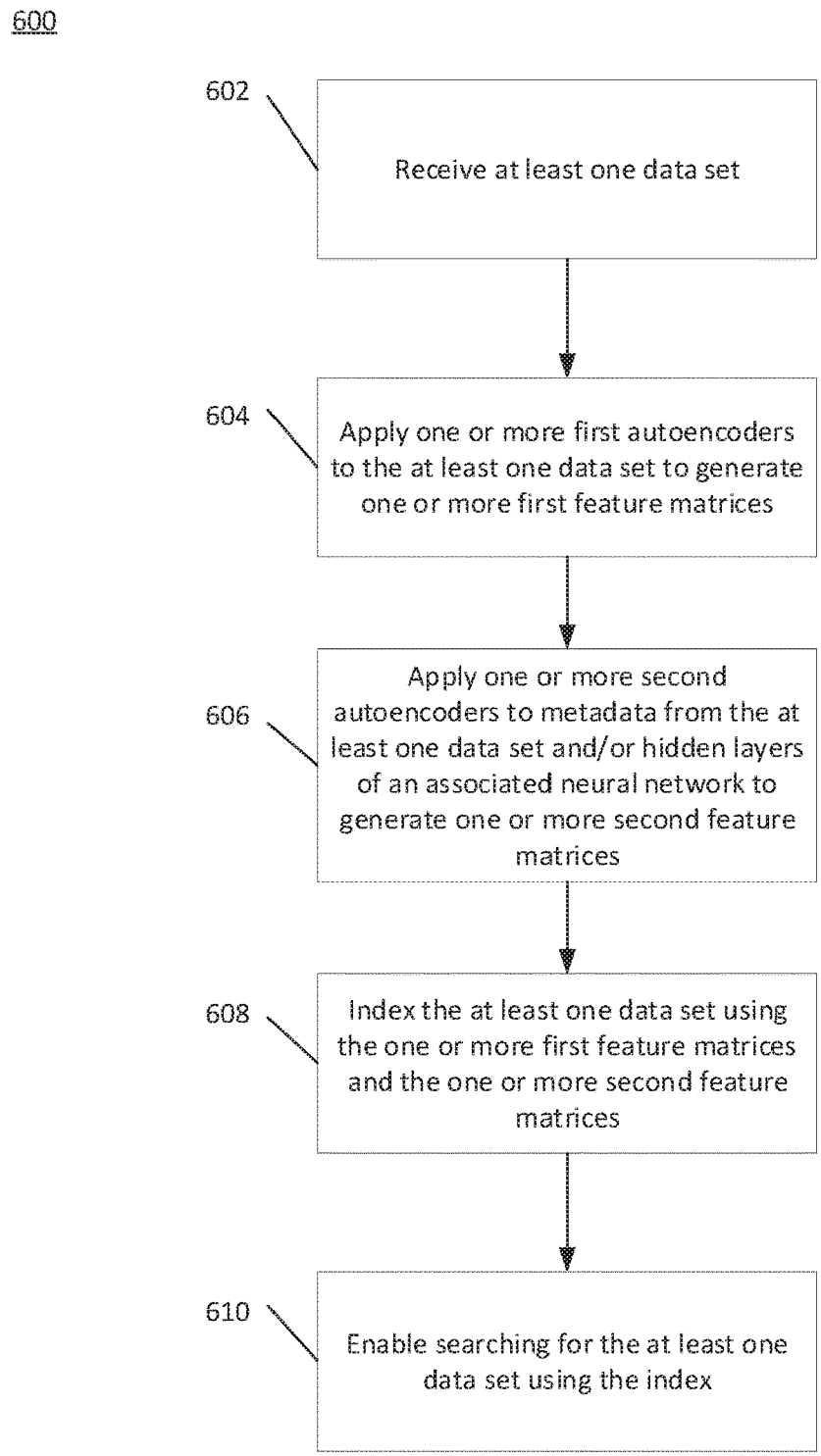
FIG. 6 depicts an exemplary process for indexing data sets using two sets of autoencoders, consistent with disclosed embodiments.

FIG. 6 is a flow diagram of an exemplary process 600 for indexing data sets. Process 600 may be executed by a system, e.g., system 200 described above.

At step 602, a processor, e.g., processor 204 of system 200, may receive at least one data set. As explained above, the at least one data set may comprise one or more files of a same type. For example, the at least one data set may comprise at least one of a plurality of text files, a plurality of spreadsheets, or a plurality of images.

At step 604, the processor may apply one or more first autoencoders to the at least one data set to generate one or more corresponding first feature matrices. For example, as explained above, the one or more first autoencoders may comprise at least one long short-term memory (LSTM) cell, a variational autoencoder, generative adversarial network (VAE-GAN), or any other autoencoder structure.

At step 606, the processor may apply one or more second autoencoders to at least a portion of at least one hidden layer of at least one neural network model to generate one or more corresponding second feature matrices. For example, the at least one neural network model may comprise at least one of a convolutional neural network (CNN) or a generative adversarial network (GAN). In such embodiments, the at least a portion of at least one hidden layer of the at least one neural network model may comprise at least one of weights or activation functions of nodes in the at least one hidden layer. Accordingly, the one or more second autoencoders may include a second autoencoder for the weights of the at least one hidden layer of the at least one neural network model and a second autoencoder for the activation functions of the at least one hidden layer of the at least one neural network model.

In some embodiments, the at least one neural network model may be configured to generate structured data based on the received at least one data set. In other embodiments, the at least one neural network may be configured to generate synthetic data, e.g., corresponding to the type of the one or more files. In such embodiments, the processor may receive the at least one neural network or may train the at least one neural network using the received at least one data set and/or using training data sets.

Additionally or alternatively, at step 606, the processor may apply one or more second autoencoders to extracted metadata to generate one or more corresponding second feature matrices. For example, the processor may extract the metadata from the at least one data set. Accordingly, the metadata may include at least one of dimensions associated with the one or more files of the at least one data set or character or pixel distributions associated with the one or more files of the at least one data set. Additionally or alternatively, the processor may extract the metadata from at least one neural network model associated with the received at least one data set. For example, the metadata may include at least one of a number of hidden layers associated with the at least one neural network model, a number of nodes in at least one hidden layer of the at least one neural network model, or a type of activation functions of one or more nodes of the at least one neural network model.

Additionally or alternatively, at step 606, the processor may apply one or more second autoencoders to synthetic data generated by the at least one neural network to generate one or more corresponding second feature matrices.

As explained above, the one or more second autoencoders may comprise a denoising autoencoder. Additionally or alternatively, similar to the first autoencoders, the one or more second autoencoders may comprise at least one LSTM cell, a VAE-GAN, or any other autoencoder structure.

At step 608, the processor may index the at least one data set using the one or more first feature matrices and the one or more second feature matrices. For example, the processor may generate a relational index such that the received at least one data set is retrievable using the one or more first feature matrices and/or the one or more second feature matrices. In other embodiments, the processor may generate a graphical index such that each data set is a node and is connected, via an edge, to one or more nodes representing the first and second feature matrices. In some embodiments, the index may comprise a first index for the one or more first feature matrices and second index for the one or more second feature matrices.

In addition, the processor may cluster the indexed data sets using the first and second feature matrices. For example, the clustering may include applying one or more thresholds to one or more vectors or other components of the first and second feature matrices to generate one or more clusters. Additionally or alternatively, the clustering may comprise at least one of hierarchical clustering, centroid-based clustering, distribution-based clustering, or density-based clustering.

In some embodiments, the clustering may comprise fuzzy clustering such that each data set has a score associated with a degree of belonging in each cluster generated by the clustering. In such embodiments, the processor may store the corresponding data sets in association with each degree of belonging.

At step 610, the processor may enable searching for data sets using the index. For example, the processor may store the at least one data set with the index such that the index is searchable. In embodiments where data sets are clustered, the processor may additionally store the clusters in association with the at least one data set.

Figure 7:
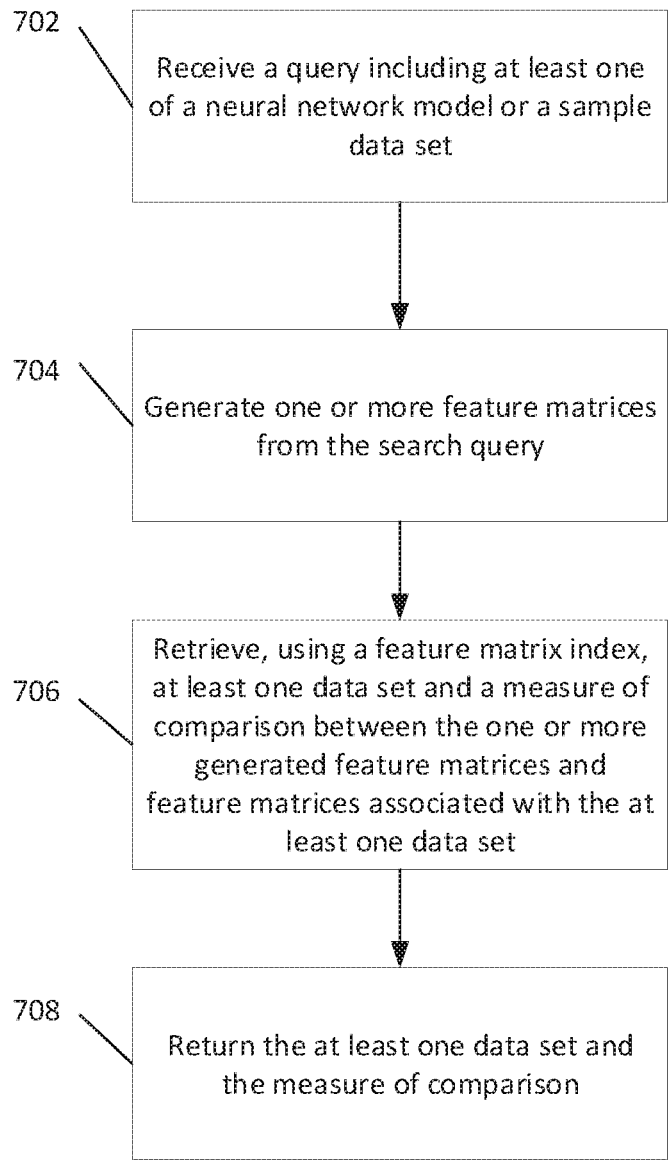
FIG. 7 depicts an exemplary process for searching indexed data sets by feature matrices, consistent with disclosed embodiments.

FIG. 7 is a flow diagram of an exemplary process 700 for searching indexed data sets consistent with disclosed embodiments. Process 700 may be executed by a system, e.g., system 200 described above.

At step 702, a processor, e.g., processor 204 of system 200, may receive a search query including at least one of a neural network model or a sample data set. In some embodiments, the query may comprise a database language query (such as a structure query language (SQL) command). In other embodiments, the query may comprise a natural language query. In such embodiments, the processor may apply natural language processing to the query to determine one or more data sets relevant to the query and generate, based on the relevant data sets, a database language query corresponding to the natural language query for executing.

At step 704, the processor may generate one or more feature matrices from the search query using at least one of one or more first autoencoders or one or more second autoencoders. For example, as explained above with respect to method 600, the one or more first autoencoders may have been used to generate feature matrices from indexed data sets, and the one or more second autoencoders may have been used to generate feature matrices from metadata, neural networks associated with the indexed data sets, and/or to synthetic data generated by the neural network(s) associated with the indexed data sets.

At step 706, the processor may use an index to retrieve at least one data set and a measure of comparison between the one or more feature matrices generated in step 704 and at least one feature matrix associated with the retrieved at least one data set. For example, the processor may apply the SQL command to a relational index. In another example, the processor may apply a ArangoDB query language (AQL) command or other NoSQL command to a graphical index. The index may include feature matrices associated with the data sets. Moreover, the database of data sets may be clustered, and the clusters may be based on the feature matrices, as explained above.

At step 708, the processor may return the at least one data set and the measure of comparison as a response to the query. For example, the processor may display the results by displaying the requested models on one region of a graphical user interface and the one or more additional model on another region of the graphical user interface. For example, interface 400 of FIG. 4 and/or interface 500 of FIG. 5 may include the results.

Figure 8:
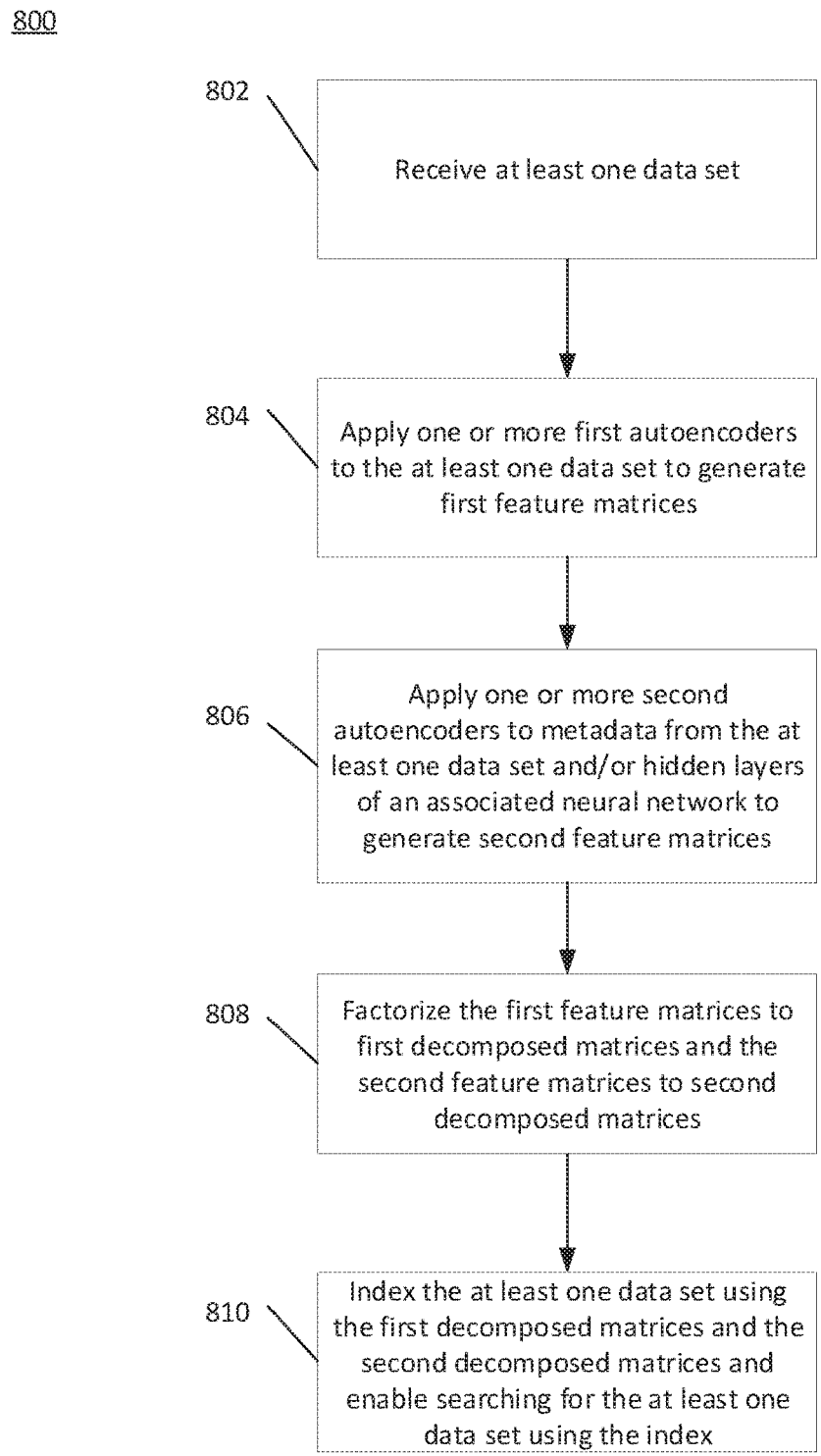
FIG. 8 depicts an exemplary process for indexing data sets using factorized matrices from two sets of autoencoders in response to model selection.

FIG. 8 is a flow diagram of an exemplary process 800 for factorizing feature matrices for indexed data sets consistent with disclosed embodiments. Process 800 may be executed by a system, e.g., system 200 described above.

At step 802, a processor, e.g., processor 204 of system 200, may receive at least one data set. As explained above, the at least one data set comprising one or more files of a same type. For example, the at least one data set may comprise at least one of a plurality of text files, a plurality of spreadsheets, or a plurality of images.

At step 804, the processor may the processor may apply one or more first autoencoders to the at least one data set to generate one or more corresponding first feature matrices. For example, as explained above, the one or more first autoencoders may comprise at least one LSTM cell, a VAE-GAN, or any other autoencoder structure. In some embodiments, the first feature matrices may have at least one dimension corresponding to non-zero integer n. For example, the first feature matrices may be n by n matrices.

At step 806, the processor may apply one or more second autoencoders to at least a portion of at least one hidden layer of at least one neural network model to generate one or more corresponding second feature matrices. For example, the at least one neural network model may comprise at least one of a convolutional neural network (CNN) or a generative adversarial network (GAN). In such embodiments, the at least a portion of at least one hidden layer of the at least one neural network model may comprise at least one of weights or activation functions of nodes in the at least one hidden layer. Accordingly, the one or more second autoencoders may include a second autoencoder for the weights of the at least one hidden layer of the at least one neural network model and a second autoencoder for the activation functions of the at least one hidden layer of the at least one neural network model.

In some embodiments, the at least one neural network model may be configured to generate structured data based on the received at least one data set. In other embodiments, the at least one neural network may be configured to generate synthetic data, e.g., corresponding to the type of the one or more files. In such embodiments, the processor may receive the at least one neural network or may train the at least one neural network using the received at least one data set and/or using training data sets.

Additionally or alternatively, at step 806, the processor may apply one or more second autoencoders to extracted metadata to generate one or more corresponding second feature matrices. For example, the processor may extract the metadata from the at least one data set. Accordingly, the metadata may include at least one of dimensions associated with the one or more files of the at least one data set or character or pixel distributions associated with the one or more files of the at least one data set. Additionally or alternatively, the processor may extract the metadata from at least one neural network model associated with the received at least one data set. For example, the metadata may include at least one of a number of hidden layers associated with the at least one neural network model, a number of nodes in at least one hidden layer of the at least one neural network model, or a type of activation functions of one or more nodes of the at least one neural network model.

Additionally or alternatively, at step 806, the processor may apply one or more second autoencoders to synthetic data generated by the at least one neural network to generate one or more corresponding second feature matrices.

As explained above, the one or more second autoencoders may comprise a denoising autoencoder. Additionally or alternatively, similar to the first autoencoders, the one or more second autoencoders may comprise at least one LSTM cell, a VAE-GAN, or any other autoencoder structure.

In some embodiments, the second feature matrices may have at least one dimension corresponding to non-zero integer m. For example, the second feature matrices may be m by m matrices. In such embodiments, the integer n may be equal to the integer m.

At step 808, the processor may factorize the first feature matrices to first decomposed matrices. For example, as explained above, factorizing the first feature matrices may comprise at least one of lower-upper decomposition or eigendecomposition.

Additionally, at step 808, the processor may factorize the second feature matrices to second decomposed matrices. For example, as explained above, factorizing the second feature matrices comprises at least one of lower-upper decomposition or eigendecomposition.

In embodiments where step 808 uses lower-upper decomposition, at least one of the first decomposed matrices or the second decomposed matrices may comprise upper triangle matrices and lower triangle matrices. In such embodiments, the index developed in step 810 (explained below) may include at least a first index corresponding to the upper triangle matrices and a second index corresponding to the lower triangle matrices.

In embodiments where step 808 uses eigendecomposition, at least one of the first decomposed matrices or the second decomposed matrices may comprise a plurality of eigenvectors. In such embodiments, the index developed in step 810 (explained below) may include at least a plurality of indices, a number of the plurality of indices matching a number of the plurality of eigenvectors.

At step 810, the processor may index the at least one dataset using the first decomposed matrices and the second decomposed matrices. For example, the processor may generate a relational index such that the received at least one data set is retrievable using the one or more first decomposed matrices and/or the one or more second decomposed matrices In other embodiments, the processor may generate a graphical index such that each data set is a node and is connected, via an edge, to one or more nodes representing the first and second decomposed matrices. In some embodiments, the index may comprise a first index for the one or more first decomposed matrices and a second index for the one or more second decomposed matrices. Although described using only the decomposed matrices, the processor may additionally store the first feature matrices and/or the second feature matrices with the received at least one data set. Accordingly, in some embodiments, the at least one data set may be indexed by both the first decomposed matrices and the second decomposed matrices as well as the first feature matrices and/or the second feature matrices.

In addition, the processor may cluster the indexed data sets using the first and second feature matrices. For example, the clustering may include applying one or more thresholds to one or more vectors or other components of the first and second decomposed matrices to generate one or more clusters. Additionally or alternatively, the clustering may comprise at least one of hierarchical clustering, centroid-based clustering, distribution-based clustering, or density-based clustering.

In some embodiments, the clustering may comprise fuzzy clustering such that each data set has a score associated with a degree of belonging in each cluster generated by the clustering. In such embodiments, the processor may store the corresponding data sets in association with each degree of belonging.

Further, at step 810, the processor may enable searching for data sets using the index. For example, the processor may store the at least one data set with the index such that the index is searchable. In embodiments where data sets are clustered, the processor may additionally store the clusters in association with the at least one data set.

Although not depicted, method 700 may thus use factorized matrices from method 800 to search for data sets rather than full feature matrices. Although the factorization may result in a fuzzier search, accuracy may be minimally impacted because both first autoencoders and second autoencoders are used.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for indexing and mapping data sets by feature matrices, comprising:
   at least one processor; and
   at least one non-transitory memory storing instructions that, when executed by the at least one processor cause the at least one processor to perform operations comprising:

receiving at least one data set, the at least one data set comprising one or more files of a same type;

applying one or more first autoencoders to the at least one data set to generate one or more corresponding first feature matrices;

generating at least one neural network model trained to generate synthetic data corresponding to the type of the one or more files;

applying one or more second autoencoders to at least a portion of at least one hidden layer of the at least one neural network model to generate one or more corresponding second feature matrices;

indexing the at least one data set using the one or more first feature matrices and the one or more second feature matrices;

enabling searching for data sets using the index;

generating one or more third feature matrices from a search query using at least one of the one or more first autoencoders or the one or more second autoencoders; and using the index, retrieve the at least one data set and a measure of comparison between the one or more third feature matrices and at least one of the one or more first feature matrices and the one or more second feature matrices.

2. The system of claim 1, wherein the at least one data set comprises at least one of a plurality of text files, a plurality of spreadsheets, or a plurality of images.

3. The system of claim 1, wherein the one or more first autoencoders comprise at least one long short-term memory (LSTM) cell or a variational autoencoder generative adversarial network (VAE-GAN).

4. The system of claim 1, wherein the one or more second autoencoders comprise a denoising autoencoder.

5. The system of claim 1, wherein the at least one neural network model trained to generate synthetic data comprises at least one of a convolutional neural network (CNN) or a generative adversarial network (GAN).

6. The system of claim 1, wherein the index comprises a first index for the one or more first feature matrices and second index for the one or more second feature matrices.

7. The system of claim 1, wherein the at least a portion of at least one hidden layer of the at least one neural network model comprises at least one of weights or activation functions of nodes in the at least one hidden layer.

8. The system of claim 7, wherein the one or more second autoencoders include a first second autoencoder for the weights of the at least one hidden layer of the at least one neural network model and a second second autoencoder for the activation functions of the at least one hidden layer of the at least one neural network model.

9. The system of claim 1, wherein enabling searching comprising storing the at least one data set in association with the index.

10. The system of claim 1, wherein generating the at least one neural network model to generate synthetic data comprises training the at least one neural network model using the at least one data set.

11. A system for indexing and mapping data sets by feature matrices, comprising:

at least one processor; and at least one non-transitory memory storing instructions that, when executed by the at least one processor cause the at least one processor to perform operations comprising:

receiving at least one data set, the at least one data set comprising one or more files;

applying one or more first autoencoders to the at least one data set to generate one or more corresponding first feature matrices;

extracting metadata from the at least one data set;

applying one or more second autoencoders to the extracted metadata to generate one or more corresponding second feature matrices;

indexing the at least one data set using the one or more first feature matrices and the one or more second feature matrices;

enabling searching for data sets using the index;

generating one or more third feature matrices from a search query using at least one of the one or more first autoencoders or the one or more second autoencoders; and using the index, retrieve the at least one data set and a measure of comparison between the one or more third feature matrices and at least one of the one or more first feature matrices and the one or more second feature matrices.

12. The system of claim 11, wherein the at least one data set comprises at least one of a plurality of text files, a plurality of spreadsheets, or a plurality of images.

13. The system of claim 11, wherein the one or more first autoencoders comprise at least one LSTM cell or a VAE-GAN.

14. The system of claim 11, wherein the one or more second autoencoders comprise at least one LSTM cell or a VAE-GAN.

15. The system of claim 11, wherein the metadata include at least one of dimensions associated with the one or more files of the at least one data set or character or pixel distributions associated with the one or more files of the at least one data set.

16. The system of claim 11, wherein the metadata are extracted from at least one neural network model trained to generate synthetic data corresponding to the at least one data set.

17. The system of claim 16, wherein the at least one neural network model trained to generate synthetic data comprises at least one of at least one of a CNN or a GAN.

18. The system of claim 16, wherein the metadata include at least one of a number of hidden layers associated with the at least one neural network model, a number of nodes in at least one hidden layer of the at least one neural network model, or a type of activation functions of one or more nodes of the at least one neural network model.

19. The system of claim 11, wherein the index comprises a first index for the one or more first feature matrices and second index for the one or more second feature matrices.

20. A system for indexing and mapping data sets by feature matrices, comprising:

at least one processor; and at least one non-transitory memory storing instructions that, when executed by the at least one processor cause the at least one processor to perform operations comprising:

receiving at least one data set, the at least one data set comprising one or more files of a same type;

applying one or more first autoencoders to the at least one data set to generate one or more corresponding first feature matrices;

generating at least one neural network model trained to generate synthetic data corresponding to the type of the one or more files;

extracting at least one of weights or activation functions from one or more hidden layers of the generated at least one neural network;

applying one or more second autoencoders to the extracted at least one of weights or activation functions to generate one or more corresponding second feature matrices;

indexing the at least one data set using the one or more first feature matrices and the one or more second feature matrices;

receiving a search query including at least one of a neural network model or a sample data set;

generating one or more third feature matrices from the search query using at least one of the one or more first autoencoders or the one or more second autoencoders; and using the index, retrieve the at least one data set and a measure of comparison between the one or more third feature matrices and at least one of the one or more first feature matrices and the one or more second feature matrices.

\* \* \* \* \*